United States Patent [19]
Bae et al.

[11] Patent Number: 6,044,459
[45] Date of Patent: Mar. 28, 2000

[54] BRANCH PREDICTION APPARATUS HAVING BRANCH TARGET BUFFER FOR EFFECTIVELY PROCESSING BRANCH INSTRUCTION

[75] Inventors: Jong Hong Bae; Se Kyoung Hong, both of Kyoungki-do, Rep. of Korea

[73] Assignee: Hyundai Electronics Industries Co., Ltd., Kyoungki-do, Rep. of Korea

[21] Appl. No.: 08/964,867

[22] Filed: Nov. 5, 1997

[30] Foreign Application Priority Data

Nov. 6, 1996 [KR] Rep. of Korea ............ 96-52484

[51] Int. Cl.$^7$ .................. G06F 9/38; G06F 9/42
[52] U.S. Cl. ............. 712/237; 712/239; 712/240; 713/501
[58] Field of Search ................. 712/207, 237, 712/215, 238, 239, 240, 218, 206, 217; 713/501; 711/5

[56] References Cited

U.S. PATENT DOCUMENTS 5,442,756 8/1995 Grochowski et al. .
5,790,845 8/1998 Shimada et al. .................. 712/238
5,848,269 12/1998 Hara ................................. 711/213

FOREIGN PATENT DOCUMENTS

| 0 649084A1 | 4/1995 | European Pat. Off. . |
| 0 689131A1 | 12/1995 | European Pat. Off. . |
| 4-355833 | 12/1992 | Japan . |
| 2250840A | 6/1992 | United Kingdom . |
| 2293671A | 4/1996 | United Kingdom . |
| WO91/13401 | 9/1991 | WIPO . |
| WO91/14224 | 9/1991 | WIPO . |

*Primary Examiner*—Daniel H. Pan
*Attorney, Agent, or Firm*—Jacobson, Price, Holman & Stern PLLC

[57] ABSTRACT

To provide a branch prediction apparatus and its method that accesses BTB using IP of an instruction whose interval between the branch instruction is the smallest, on the basis of a branch instruction's fetch among the instructions that can be fetched prior to one cycle, and also that fetches the branch target after N cycle, after BTB accessing, storing the information of the cycle interval N1 between the branch access instruction and branch instruction inside BTB entry.

5 Claims, 6 Drawing Sheets

FIG. 7

| ACCESS ADDRESS | TARGET ADDRESS | VALID BIT | HISTORY BIT |

FIG. 8

| ACCESS ADDRESS | TARGET ADDRESS | Nx | Ny | VALID BIT | HISTORY BIT |

BRANCH PREDICTION APPARATUS HAVING BRANCH TARGET BUFFER FOR EFFECTIVELY PROCESSING BRANCH INSTRUCTION

BACKGROUND OF THE INVENTION

1. Field of the Invention

The present invention relates to a microprocessor, e.g., a superscalar microprocessor which includes BTB (Branch Target Buffer) for branch prediction; and, more particularly, a branch prediction apparatus and method that efficiently fetch the target address of a branch instruction, constructing the BTB entry into single BTB entry based on the branch instruction, and accessing BTB before the branch instruction fetch.

2. Description of the Prior Art

In the latest high performance microprocessor which contains a superscalar structure, it is structured to adapt an instruction pipe-line to increase its performance. As stages of the pipe-line are increased, the execution cycle of a microprocessor is shortened so that the performance can be enhanced. But since the branch penalty, due to the increase of a branch delay cycle during the execution of the branch instructions, is increased, the whole performance of the processor is decreased. To reduce the branch penalty, static methods employing a software and dynamic methods employing a hardware has been generally suggested. The conventional static method can't reduce the branch penalty sufficiently, and can't keep the compatibility of software, whereas the cost of the hardware is low. On the other hand, although the realization cost is high, the dynamic method is employed in a current process, e.q., Pentium manufactured by Intel Co., in that it can keep the compatibility of software and decrease the branch penalty cycle sufficiently.

BTB operates as an independent branch instruction cache which stores an instruction pointer (hereinafter referred to IP) of an instruction and IP of a predicted branch target instruction. Therefore, it is possible to fetch the predicted branch object instruction during the branch delay cycle, referring to these Ips, and this can complete the execution of the branch instruction within the unit pipe-line cycle in the case that the prediction of a branch course is same as the actual execution result.

Also, in the latest high performance microprocessor, in order to fetch the target instruction more rapidly, during the access of BTB, they access BTB based on a previous IP in stead of the IP of the branch instruction. However, the problem of the conventional method is that, in the superscalar microprocessor which execute fetching several instruction to a single cycle, the IP, which accesses BTB according to the change of the instruction fetch sequence, is changed so that BTB entries are invalid.

SUMMARY OF THE INVENTION

An object of the present invention is to provide an apparatus and method for predicting a branch using a BTB capable of performing an effective branch target fetch. The BTB according to the present invention is accessed using an IP of an instruction of which interval between a branch instruction is smallest. To perform this BTB access, an entry therein includes the IP of the BTB to be fetched at more than one cycle interval prior to the branch instruction fetch, based on each branch instruction.

In accordance with an aspect of the present invention, there is provided A branch prediction apparatus having a branch target buffer, wherein the branch target buffer (BTB) includes a plurality of entries for effectively processing branch instructions in a multiple pipe line construction of a superscalar microprocessor, wherein each entry comprises: a first instruction point of a BTB access instruction of which fetch is available prior to at least one cycle of a branch instruction fetch, wherein an interval between the BTB access instruction and the branch instruction is smallest; a second instruction point of a predicated branch target instruction; and cycle interval information for compensating for a cycle interval between the BTE access instruction and the branch instruction.

BRIEF DESCRIPTION OF THE DRAWINGS

The above and other objects and features of the present invention will become apparent from the following description of preferred embodiments given in conjunction with the accompanying drawings, in which:

FIG. 7 is a diagram of a conventional BTB entry format; and

FIG. 8 is a diagram of a BTB entry format of the present invention.

DETAILED DESCRIPTION OF THE PREFERRED EMBODIMENT

In the following description, numerous specific details on the present invention are set forth referring to the attached drawings.

Figure 1:
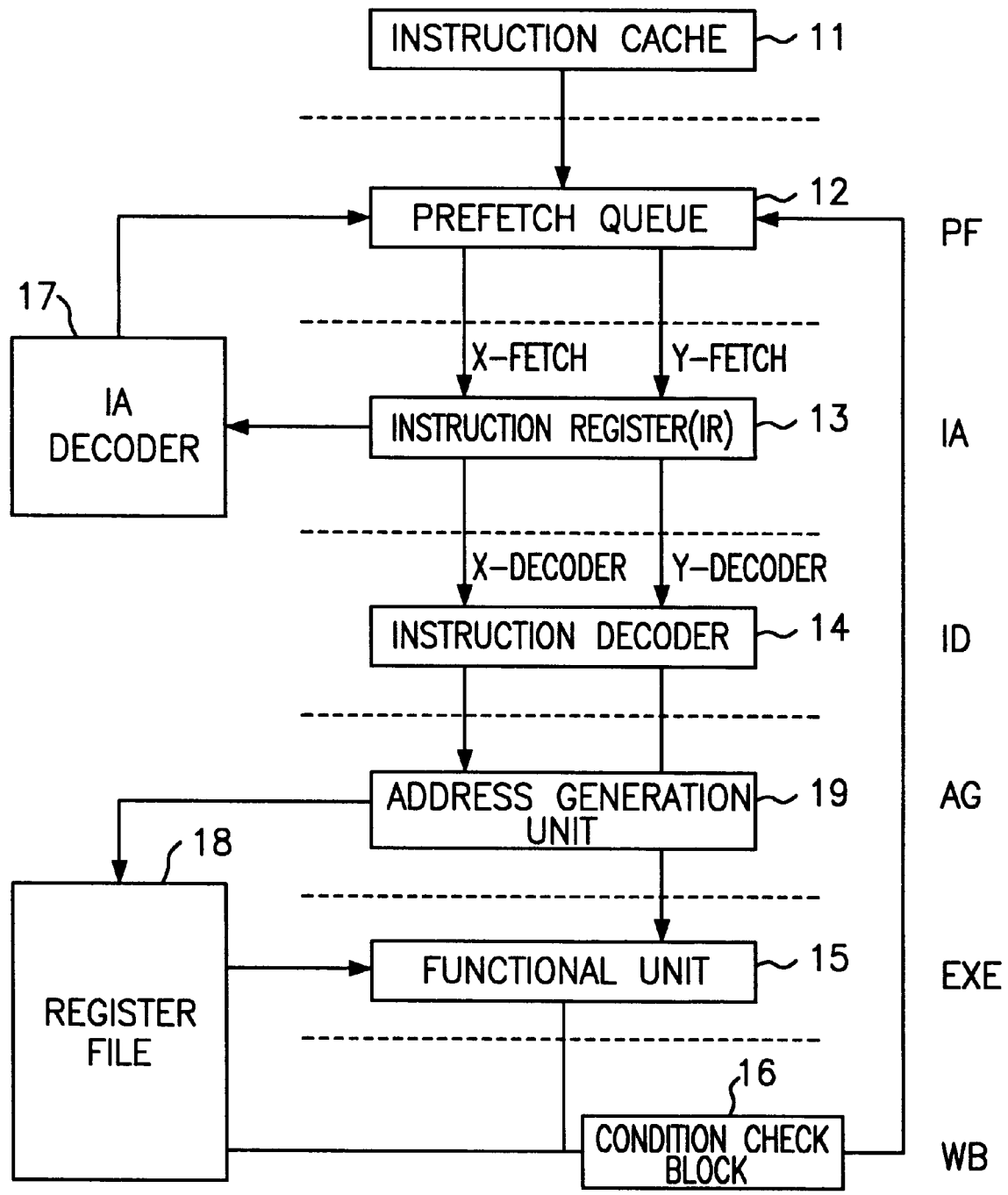
FIG. 1 is a block diagram which illustrates the superscalar microprocessor briefly in each pipe-line stage.

Referring to FIG. 1, there is shown a block diagram illustrating the superscalar microprocessor having a plurality of pipe-line stages. The superscalar microprocessor includes an instruction cache 11, a prefetch queue 12, an instruction register 13, an instruction decoder 14, a functional unit 15, an address generation unit 19. The superscalar microprocessor is also implemented by using six pipe-line stage; PF (Prefetch), IA(Instruction Address), ID(Instruction Decoder), AG(Address Generation), EXE(Execution), and WB(Write-Back).

PF stage includes a prefetch step for previously retrieving the instructions from the instruction cache 11 and the external memory and storing them to prefetch queue 12 in order to reduce a fetching time.

IA stage has a step for prefetching the instructions from prefetch queue 12 via each pipe-line to calculate the next IP.

ID stage contains a step for decoding the instruction by using two decoders per each pipe-line and for checking whether the instructions can be simultaneously executed during an identical cycle of each pipe-line (check the pairing of the two pipe-line).

AG stage provides a step, receiving the outputted information from the instruction decoder 14, for calculating the address of the operand to generate a calculated result to the register file 18.

EXE stage is a step for executing an actual operation and for setting a flag related to branch during the branch instruction execution.

WB stage includes a step for writing the execution result onto the register file 18 and for checking the branch condition finally during the branch instruction execution. In this case, during the branch instruction execution, the condition check of a branch instruction is obtained in the WB stage by receiving the result from EXE stage of the pipe-line to thereby control the prefetch queue 12 by using the check result.

For the sake of convenience, assume that there are two pipe-lines referred to X and Y.

Figure 2:
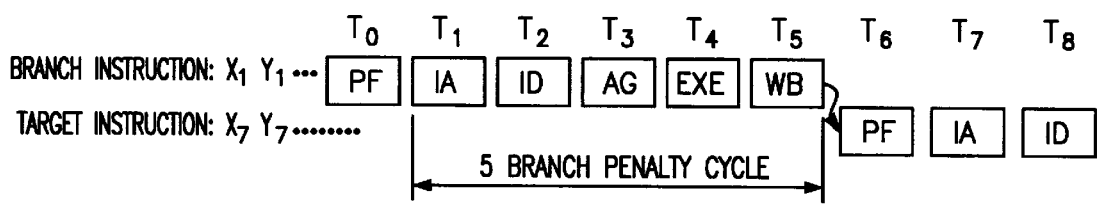
FIG. 2 is a diagram of the conventional processing of a branch instruction.

Referring to FIG. 2, there is shown the conventional process of a branch instruction. Ti means the first cycle, and Xi and Yi indicate the instructions that are fetched from each of the X and Y pipe lines during Ti. If the branch instruction is fetched during Ti, the branch target address is determined at T5 and the target instruction is prefetched at T6 and fetched at T7. Accordingly, a five branch penalty cycles occur in the conventional process. At this time, Xi and Yi refer to paired instructions which can be executed at the same.

Figure 3:
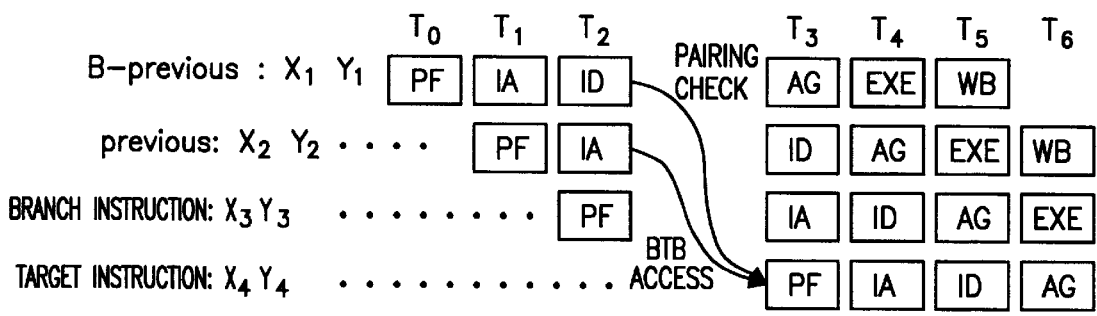
FIG. 3 is a diagram of another processing of branch instruction.

Referring to FIG. 3, there is shown a another conventional process of a branch instruction. In the following circle of which the branch instruction is prefetched, In order to make the branch target instruction be fetched at the following circle of which the branch instruction is prefetched, the BTB is accessed through the use the instruction previous IP (X2 Y2) fetched at the previous cycle of the branch instruction; and, the final target address of the branch instruction is determined after the check of pairing the B-previous cycle (X1 Y1) instruction.

At this time, the BTB access address registered to BTB, is selected from the two instructions of the previous cycle and, for the sake of convenience, the instruction corresponding to the X pipe line is registered. Although the branch prediction of this method entails that the branch penalty cycle of the branch instruction becomes zero, according to the pairing condition of the instruction fetched prior to branch instruction, the address registered to BTB should be changed so that the numerous entries to the BTB, as shown in FIG. 4, are stores in the BTB.

Figure 4A:
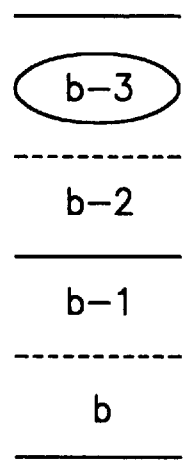
FIG. 4 illustrates numerous entries which are registered to a BTB in the conventional processing of branch instruction.
Figure 4B:
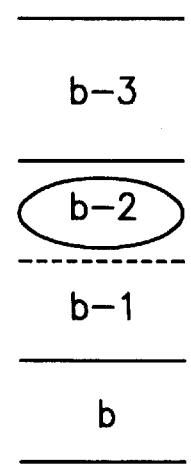
Figure 4C:
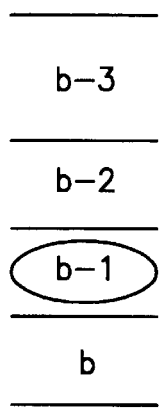

Referring to FIG. 4, there is shown the entries registered to BTB in the conventional processing of branch instruction. As shown, b represents the branch instruction, b-n represents an instruction executed at X or Y pipe line, while the boundary designated by using a dotted line represents the other paired instruction that is performed at the same cycle; and a solid line represents the instruction that is performed in other cycle.

That is, in case (A), the branch instructions b and b-1 are paired and executed at the X-pipe and the Y-pipe, respectively. Further, in this case, the instructions b-3 and b-2 are paired at a just-previous cycle (the first cycle) of the branch instruction and executed at the X- and Y-pipes, respectively. In case (B), the unpaired branch instruction b is singularly executed at the third cycle and the instructions b-2 and b-1, which are paired at a just-previous cycle (the second cycle) of the branch instruction, are executed at the x- and Y-pipes, respectively. Finally, in case (C), the unpaired branch instruction b is singularly executed at the fourth cycle and the instructions b-3, b-2 and b-1, which are not paired at the cycle prior to the branch instruction, are independently executed on the basis of the cycle.

In each case of (a), (b) and (c), the instruction fetched at the X-pipe during the previous cycle prior to the branch instruction becomes b-3, b-2, and b-1 and their corresponding IP should be registered to BTB entry.

Figure 5:
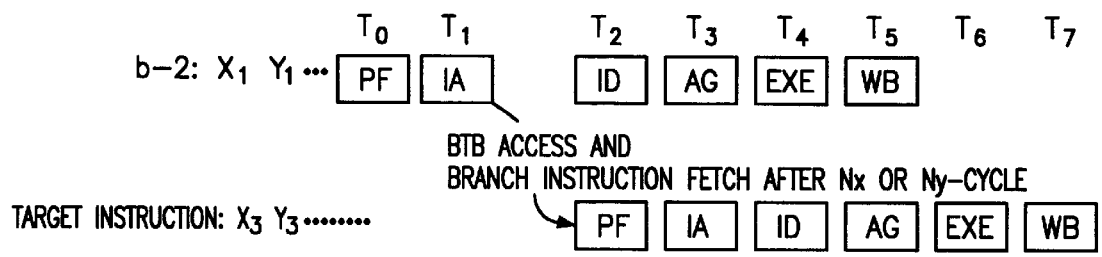
FIG. 5 is a diagram illustrating a branch instruction processing in accordance with the present invention.

FIG. 5 shows the process of a branch instruction in accordance with one embodiment of the present invention. In the process, the BTB is accessed by using the IP of an instruction X1 or Y1 which has a smallest interval from the fetch of the branch instruction, among the instructions that can be fetched up to one cycle of the branch instruction fetch cycle. In FIG. 5, the instruction X1 or Y1 is fetched at cycle b-2. Then the branch target instruction (X3 or Y3), after Nx at the X-pipe and Ny at the Y-pipe, is fetched by using the information of the cycle interval between the branch instruction and the instruction to access the BTB entry. Nx and Ny are registered, in the BTB entry according to an execution result from when the BTB access instruction is fetched at the X- or the Y-pipe. In accordance with the present invention, the branch prediction can be implemented in a superscalar microprocessor by using a single BTB entry (IP of b-2) according to those branch prediction methods.

Figure 6A:
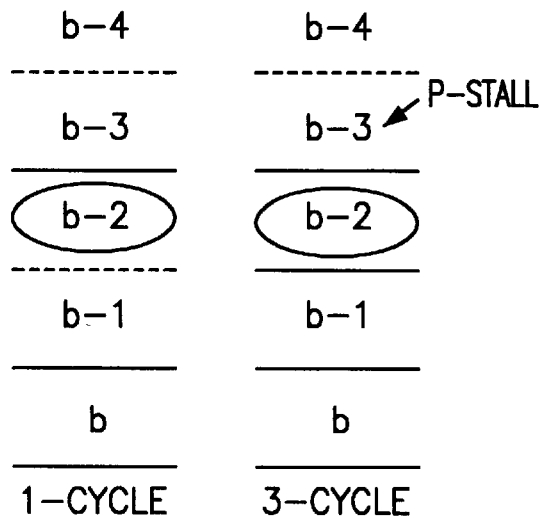
FIG. 6 illustrates a cycle interval between the using BTB entry according to the present invention and the branch instruction.
Figure 6B:
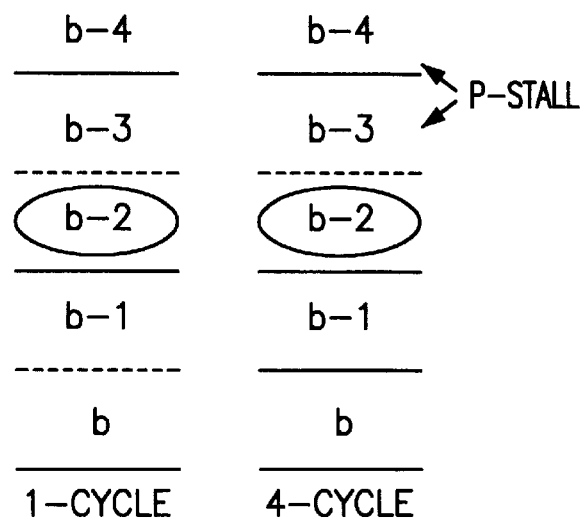

Referring to FIG. 6, there is shown the cycle interval between the BTB use entry (X1 or Y1 of the cycle b-2 in FIG. 5) and the branch instruction in accordance with the present invention. In case (A) in FIG. 6, there are shown two cases where the instruction (BTB access instruction) to access the BTB entry exists in the X-pipe. In case(A), the unpaired branch instruction b is independently executed at the third cycle and the instruction b-2 of the X-pipe and the instruction b-1 of the Y-pipe are paired and executed at the second cycle. However, as mentioned above, when the instruction b-2 of the X-pipe is an instruction whose interval between the branch instruction is smallest, the BTB entry is accessed by using the IP of the instruction b-2. At this time, since the difference between the BTB access instruction and the branch instruction may be one cycle and the interval between the BTB access instruction and the branch target instruction may be two cycles, the branch target instruction is fetched after two cycles from the BTB access instruction.

In the other case (A), the unpaired branch instruction b is independently executed at the fourth cycle and the BTB entry is accessed at the second cycle by using the IP of the unpaired instruction b-2 of the X-pipe. Also, since the interval between the BTB access instruction and the branch instruction becomes three cycles and the cycle interval between the BTB access instruction and the branch target instruction becomes four cycles, the branch target instruction is fetched after foul, cycles from the BTB access instruction.

Similarly, in case (B) in FIG. 6, there are shown two cases where the instruction (BTB access instruction) to access the BTB entry exists in the Y-pipe. In one case, the branch instruction b and the instruction b-1 are paired and executed at the third cycle and the instruction b-2 of the Y-pipe and the instruction b-3 of the X-pipe are paired and executed at the second cycle. However, the instruction b-2 of the Y-pipe is an instruction whose interval between the branch instruction is smallest so that the BTB entry is accessed using the IP of the instruction b-2. At this time, if the interval between the BTB access instruction and the branch instruction may be one cycle, the cycle interval between the BTB access instruction and the branch target instruction may be two cycles and the branch target instruction is fetched after two cycles from the BTB access instruction.

In the other case (B), the unpaired branch instruction b is independently executed at the fourth cycle and the BTB entry is accessed at the second cycle by using the IP of the unpaired instruction b-2 of the Y-pipe. Also, when there is the interval between the BTB access instruction and the branch target instruction becomes four cycles, the branch target instruction is fetched after five cycles from the BTB access instruction because the interval between the BTB access instruction and the branch target instruction becomes five cycles.

As a result, when the BTB access instruction b-2 is fetched at the X-pipe, the cycle interval between the branch instructions become a minimum of one cycle and a maximum of three cycles and the cycle interval Nx between the BTB access instruction b-2 and the branch target instruction becomes a minimum of two cycles and a maximum of four cycles. Then, P-stall means the additional delay cycle caused when the instruction b-4 and b-3 are not paired. That is, when b-2 is in the IA stage, b-4 and b-3 are in the ID stage. When b-4 and b-3 is not paired, b-3 and b-2 is in the ID stage in the following cycle. As a result, the additional delay cycle caused by the unpairing of b-4 and b-3. If b-2 is fetched in the Y-pipe in a same way, the cycle interval between the branch instruction becomes a minimum of one cycle and a maximum of four cycles. Further, the cycle interval Ny between the instruction b-2 and the branch target instruction becomes a minimum of two cycles and a maximum of four cycles.

Referring to FIG. 7, the conventional BTB entry format includes an access address, a target address, a valid bit and a h8istory bit. The target address is obtained by using the access address; the truth and false of the target address is then checked by using valid bit; and then the direction prediction of the branch instruction is determined based on the branch history bit.

The present BTB entry format shown in FIG. 8, includes an access address, a target address, a valid bit and a history bit and further includes the 2-bit cycle intervals Nx and Ny between the branch target instruction when the BTB access instruction b2 is fetched at the X- and Y-pipes. The branch target address is obtained by using the BTB access address; the truth and false of the branch target address is then checked by using valid bit; the direction prediction of the branch instruction is then, determined based on the branch history bit; and the branch target instruction is fetched by using an assigned cycle interval information after the Nx or the Ny cycle. At this time, as shown in FIG. 6, the 2-bit cycle intervals Nx and Ny indicate two cycle intervals at "00", three cycle intervals at "01", four cycle intervals at "10" and five cycle intervals at "11".

To summarize the process of the present invention, it provides the method which includes a step for accessing the BTB prior to the branch instruction fetch by using a single BTB entry to fetch the target address of branch instruction in order to enhance the performance of the superscalar microprocessor. For this, prior to one cycle of the branch instruction, the IP of the instructions having the smallest interval between the branch target instruction, is assigned in the BTB and the BTB entry cycle information is stored in order to compensate the cycle interval between the branch access instruction and branch instruction.

The present invention described from the above is not limited to the previous mentioned examples and the attached diagrams. But it is obvious for the person who skilled in the art that the present invention belongs to that various substitution, transformation and modification.

Although this invention is illustrated and described herein embodied as a microprocessor design, this invention is nevertheless not intended to be limited to the details as shown. Rather, various modifications may be made in the details within the scope and range of equivalents of the claims and without departing from the spirit of this invention.

What is claimed is:

1. A branch prediction apparatus, wherein a fetch is available prior to one cycle of a branch instruction instead of an instruction pointer of said branch instruction to a branch target buffer (BTB) entry for a single BTB entry construction on one branch instruction, comprising:

a BTB being constructed with a plurality of entries which store the instruction pointer of a branch instruction and the instruction pointer of a predicted branch target instruction, wherein said BTB entry comprises the branch prediction apparatus which includes a branch access instruction pointer, said instruction pointer of the branch target instruction, interval information of which the branch instruction is accessed, in a first pipe-line, said interval information of which the branch is accessed in a second pipe-line, a valid bit that shows the validity of said branch target instruction pointer and a history bit.

2. The branch prediction apparatus of claim 1 wherein said BTB entry comprises said branch prediction apparatus which stores an interval instruction to said BTB entry to compensate a cycle interval between a branch access instruction and said branch instruction.

3. A branch prediction apparatus having a branch target buffer (BTB), wherein the BTB includes a plurality of entries for effectively processing branch instructions in a multiple pipe line construction of a superscalar microprocessor, wherein each entry comprises:

a first instruction point of a BTB access instruction of which fetch is available prior to at least one cycle of a branch instruction fetch, wherein an interval between the BTB access instruction and the branch instruction is the smallest among the branch instructions that can be fetched before one cycle;

a second instruction point of a predicted branch target instruction; and cycle interval information for compensating for a cycle interval between the BTB access instruction and the branch instruction.

4. The branch prediction apparatus in accordance with claim 3, wherein the cycle interval information comprises:

a first cycle interval information at an X-pipe line when the BTB access instruction is executed at the X-pipe line; and a second cycle interval information at an Y-pipe line when the BTB access instruction is executed at the Y-pipe line.

5. The branch prediction apparatus in accordance with claim 4, wherein each entry further comprises a valid bit and a history bit for indicating validity of an instruction point of the branch target instruction.

* * * * *